United States Patent [19]
Thornton

[11] 4,095,892
[45] Jun. 20, 1978

[54] PHOTOGRAPHIC DEVELOPING APPARATUS EMPLOYING AN EASEL SELECTIVELY LOCATABLE ON A SUPPORT

[76] Inventor: Leonard A. Thornton, 902 Lockwood La., Santa Cruz, Calif. 95066

[21] Appl. No.: 724,414

[22] Filed: Sep. 17, 1976

[51] Int. Cl.² ............................................. G03B 27/58
[52] U.S. Cl. ............................................ 355/74; 355/54
[58] Field of Search .................................. 355/54, 74

[56] References Cited

U.S. PATENT DOCUMENTS

| | | | |
|---|---|---|---|
| 3,289,531 | 12/1966 | Streit | 355/54 |
| 3,728,021 | 4/1973 | Retzyl et al. | 355/74 |
| 3,944,364 | 3/1976 | Petrini et al. | 355/74 |

FOREIGN PATENT DOCUMENTS 985,450  3/1951  France ................................. 355/74

*Primary Examiner*—Richard A. Wintercorn
*Attorney, Agent, or Firm*—Boone, Schatzel, Hamrick & Knudsen

[57] ABSTRACT

A photographic developing apparatus comprising a rectangular easel with upper and lower edges, opposed first and second side edges and opposed top and bottom surfaces, the easel including sidewalls that form the top surface into a paper support surface capable of supporting a sheet of photographic print paper, a plurality of covers arranged in first and second parallel columns in a covering relationship on the paper support surface and hinged to the sidewalls such that the covers are capable of being selectively opened and closed and a plurality of lateral grooves formed in the bottom surface, and an easel support including a planar surface having a central area corresponding to a predetermined location, four rectangular elements each including an inner locating surface so as to provide opposed first and second side surfaces and opposed upper and lower surfaces, the side surfaces and the upper and lower surfaces having a dimension such that when the easel is positioned on the planar surface with its lower edge and its first side edge abutting the lower and the first surfaces, respectively, the upper cover in the second column is in the predetermined location, and a ridge extending laterally between the side surfaces and serving to engage a groove so as to retain the easel in a plurality of fixed locations, each corresponding to a location wherein a cover is disposed in the predetermined location. When one of the side edges abuts the corresponding side surface and the ridge engages a groove each cover is capable of being located in the predetermined location.

16 Claims, 6 Drawing Figures

U.S. Patent   June 20, 1978   4,095,892
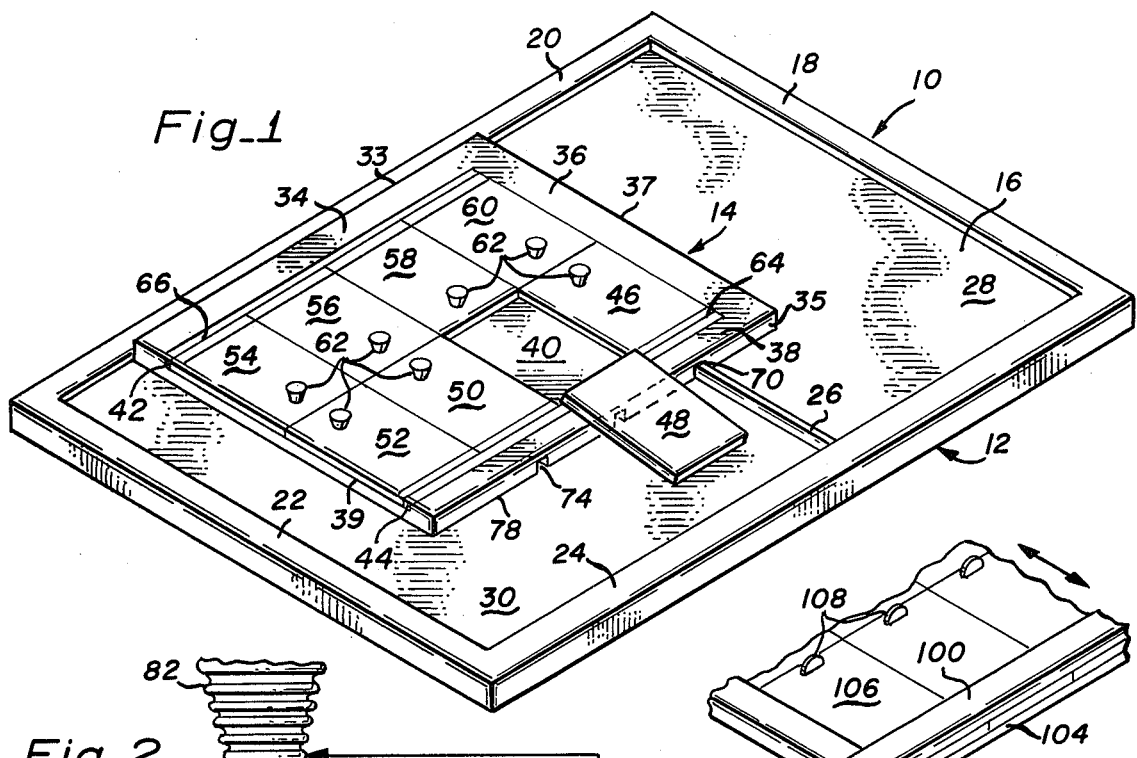
Fig_1
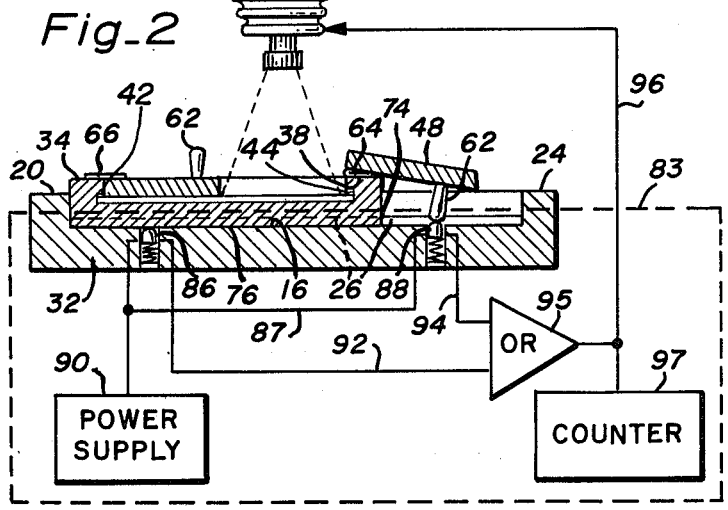
Fig_2
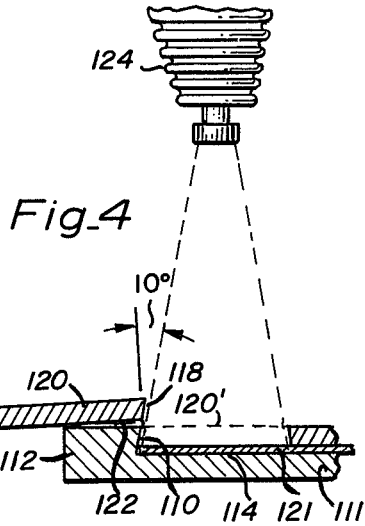
Fig_3
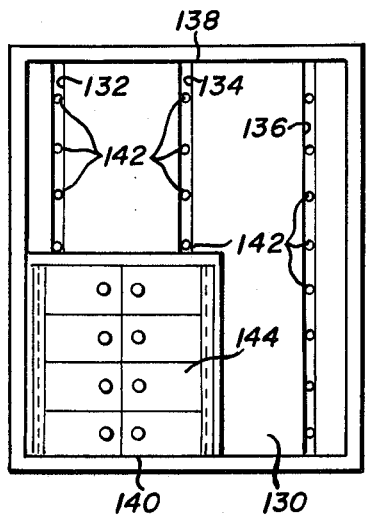
Fig_5
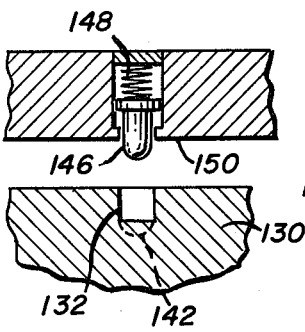
Fig_4
Fig_6

PHOTOGRAPHIC DEVELOPING APPARATUS EMPLOYING AN EASEL SELECTIVELY LOCATABLE ON A SUPPORT

BACKGROUND OF THE INVENTION

1. Field of the Invention

The present invention relates generally to photographic developing devices, and more particularly, to such a device that employs an easel support and an easel selectively locatable on the support in such a manner that a multiplicity of prints are capable of being produced from a single composition.

2. Description of the Prior Art

Heretofore, photographic developing devices have employed an easel with a multiplicity of covers arranged to selectively mask portions of a sheet of photographic paper. In such a device a negative, held by an associated enlarger, is composed on the top surface of the cover. Then the cover is opened and the photographic paper beneath the opened cover is exposed. Next, the easel is moved to a new position wherein another cover is generally within the beam of the enlarger bulb, the negative is composed, the enlarger is focused and the exposing process repeated. A disadvantage of such a device is that additional focusing and/or composing is necessary in order to obtain each print. As a consequence, relatively large amounts of time are required to print several prints on one sheet of paper. In addition, during the focusing and composing operations the enlarger is required to be turned "on". This, of course, decreases the lifetime of the relatively expensive enlarger bulbs.

In the patent art, several patents teach photographic developing devices. In particular, U.S. Pat. No. 3,944,364 entitled "Borderless Printing Easel" by Richard R. Petrini and Dorin F. Van Lue teaches a borderless printing easel including a paper support base and a set of mask plates removably positionable on the base which are hinged in such a manner as to enable each mask plate to be folded onto the top of an adjacent plate. This easel is capable of reproducing adjacent or nearly adjacent borderless prints on a single sheet of print paper.

Another printing easel comprising hinged doors which separately open and close to expose selected portions of a sheet of photographic paper is described in U.S. Pat. No. 3,230,823 entitled "Easel for Printing a Plurality of Photographs" by Nicholas Krassopoulos.

In addition, U.S. Pat. No. 3,728,021 entitled "Multiple Print Easel" by Rudolph Retzyl and Martin D. Blanc disposes a print easel having various sized openings formed in a cover portion of a frame. A paper holder is slideably mounted to the base of the frame and is movable to enable a portion of the photographic paper held on the holder to be positioned beneath a selected cover. Such an easel produces prints which are spaced apart and typically requires the paper holder to be removed and turned 180° to print on the upper portion of the sheet. However, none of the devices teach an apparatus in which an easel support is capable of engaging an easel having a plurality of covers, so as to guide the easel to selected locations on the support in such a manner that each cover is locatable in a predetermined location and as to enable a plurality of prints to be produced on a piece of photographic paper with a single focus of an associated enlarger.

SUMMARY OF THE PRESENT INVENTION

Accordingly, it is a primary object of the present invention to provide a photographic developing apparatus which is able to provide a multiplicity of prints with a single focus and/or composition of an enlarger.

Another object of the present invention is to provide a photographic developing apparatus which is capable of producing a multiplicity of prints in a relatively short printing time so as to effectively extend the life expectancy of the relatively expensive bulbs utilized in the enlarger.

Still another object of the present invention is to provide a photographic developing apparatus which is capable of providing borderless prints from any size negative.

Briefly, the preferred embodiment comprises an easel having a rectangular shape in plan view with opposed upper and lower edges, opposed first and second side edges and opposed top and bottom surfaces, the easel including first and second opposed elongated sidewalls adjacent the side edges and protruding from the top surface so as to form the central portion of the top surface into a rectangular planar paper support surface having an areal dimension that is capable of supporting a sheet of photographic print paper, a plurality of covers arranged in first and second parallel columns in a covering relationship on the paper support surface, a first hinge for hinging the covers in the first column to the first sidewall such that the covers are capable of being selectively opened and closed, a second hinge for hinging the covers in the second column to the second sidewall such that the covers are capable of being selectively opened and closed, and a plurality of lateral grooves formed in the bottom surface, and an easel support including a planar surface having a central area corresponding to a predetermined location, four elongated elements protruding from the planar surface and arranged in a rectangular pattern, the elements each including an inner locating surface so as to provide opposed first and second side surfaces and opposed upper and lower surfaces, the side surfaces and the upper and lower surfaces having a dimension such that when the easel is positioned on the planar surface with its lower edge and its first side edge abutting the lower and the first surfaces, respectively, the upper cover in the second column is in the predetermined location, and a ridge extending laterally between the side surfaces and serving to engage a groove so as to retain the easel in a plurality of fixed locations, each fixed location corresponding to a location wherein a cover is disposed in the predetermined location.

In operation when the first side edge abuts the first surface and the ridge engages the groove each cover in the second column is capable of being located in the predetermined location, and whereby when the second side edge abuts the second surface and the ridge engages a groove each cover in the first column is capable of being located in the predetermined location.

An advantage of the present invention is that it is rugged and durable in construction and requires a single focus to provide a multiplicity of prints from one or more negatives.

Another advantage of the present invention is that it does not require a unique composition for each exposure and hence serves to reduce the printing time for producing a multiplicity of prints from one or more negatives.

Still another advantage of the present invention is that it serves to effectively extend the life expectancy of an enlarger bulb.

Yet another advantage of the present invention is that it serves to provide borderless prints.

These and other objects and advantages of the present invention will no doubt become apparent following a reading of the following detailed description of the preferred embodiments which are illustrated in the several figures of the drawing.

IN THE DRAWING

FIG. 1 is a perspective view of a photographic developing apparatus in accordance with the present invention;

FIG. 2 is a cross section view taken through the lines 2-2 of FIG. 1 and illustrating in dashed lines an additional feature of the present invention in which an electronic circuit is provided for automatically actuating an enlarger;

FIG. 3 is a partial perspective view of an alternative embodiment of the invention in which the easel includes sliding doors;

FIG. 4 is a cross section view of another alternative embodiment of the invention in which the easel is formed to conform to the angle of the beam developed by the enlarger;

FIG. 5 is a plan view of still another alternative embodiment of the invention; and FIG. 6 is a cross section view of a spring detent mechanism employed in the embodiment illustrated in FIG. 5.

DETAILED DESCRIPTION OF THE PREFERRED EMBODIMENTS

Referring now to FIG. 1 of the drawing, the photographic developing apparatus 10 of the present invention is illustrated in a perspective view. The apparatus 10 includes an easel support 12 and an easel 14.

The support 12 has a generally rectangular shape in plan view and includes a planar, rectangular top surface 16, four elongated elements 18, 20, 22 and 24 that project above, and form a border for, the surface 16 and an elongated ridge, or guide, 26. The elements 18 and 22 are parallel and form the short sides of the border. Similarly, the elements 20 and 24 are parallel and form the long sides of the border. The inner surfaces or edges of the elements 20 and 24 have a generally smooth finish to facilitate a sliding relationship with the easel 14 in a manner which will be subsequently described in detail. The ridge 26 extends between the elements 20 and 24 in a direction parallel to that of the elements 18 and 22 so as to divide the surface 16 into a rectangular upper region 28 and a rectangular lower region 30. The lower region 30 encompasses a larger area than the upper region 28. The ridge 26 extends a dimension such that its top surface is generally coplanar with the top surfaces of the elements 18-24.

In the preferred embodiment, the support is formed from a material having nonskid properties, such as tempered masonite, the border elements are formed from a vinyl material having a wood grain appearance, and the top surface has a white color. In addition, the distance between the inner edges of the elements 20 and 24 is about 13¼ inches, the distance between the inner edge of the element 18 and the upper edge of the ridge 26 is about 7⅜ inches, and the distance between the inner edge of the element 22 and the lower edge of the ridge 26 is about 10¾ inches, although the distances will vary in accordance with the size of the easel. Alternatively the support may include rubber feet.

The easel 14 is generally rectangular in plan view and includes a base 32 and three elongated edge elements 34, 36 and 38 that are disposed along the top and side edges of the base 32 in an inverted U-shape configuration. The side surfaces 33 and 35 of the base 32 and corresponding side elements 34 and 38 have a generally smooth finish and are adapted to slideably engage the inner surfaces of the border elements 20 and 24. The upper and lower surfaces 37 and 39, respectively, are spaced apart a distance equal to that between the upper edge of the element 22 and the lower edge of the ridge 26. Hence the easel 14 fits snugly into the lower region 30. The central portion of the base 32 that is not covered by the elements 34-38 provides a rectangular paper support surface 40 for supporting a sheet of photographic print paper or the like. The inner surfaces of the side elements 34 and 38 have notched lower portions that form respective channels 42 and 44 with corresponding subjacent surfaces of the base 32. The channels 42 and 44 serve to receive and hold the edges of the sheet of print paper when the sheet is placed on the paper support surface 40. In the preferred embodiment the paper support surface is 8 inches by 10 inches.

Eight rectangular mask plates or covers 46-60 having identical dimensions are disposed in an overlying manner on the support surface 40 and arranged to completely cover such surface in a pattern comprising two columns, each having four rows. Each cover includes a handle, or tab, 62 and is adapted to be held within the retaining portion of the border elements to cover a one-eighth portion of the support surface 40. In the preferred embodiment, each cover is 3¾ inches in width by 2½ inches in height. The covers 46-52 are connected to the border element 38 with a hinge 64. Similarly, the covers 54-60 are connected to the border element 34 with a hinge 66. The hinges 64 and 66 enable each of the covers 46-60 to be folded back against the top of the adjacent border element. In this manner, the covers can be selectively opened to uncover a desired portion of the underlying print paper. Hence, one or more of the covers can be selectively folded back to produce a print having a preselected size corresponding to the number of covers that are opened or to produce eight prints of equal size. In the preferred embodiment, the hinges are formed from a thin continuous strip of adhesive tape, or the like, which is adapted to adhere to the juxtaposed top surfaces of the covers and the border elements. Accordingly, when the cover overlies the print paper, such top surfaces are generally coplanar and when the cover is opened, the top surfaces abut one another. Because of the continuous nature of the hinges, light emitted by the enlarger bulb during exposure is prevented from striking the edges of the print paper except on those portions which are uncovered by the folded-back cover.

In accordance with the feature of the present invention, three laterally-extending parallel grooves 70, 72 and 74 are formed in the bottom surface 78 of the easel 14. The grooves 70-74 have a size sufficient to receive the ridge 26, while allowing the ridge to be slideably movable therein.

The upper groove 70 is displaced from the upper edge 37 of the bottom surface 78 by a distance equal to the shorter face dimension of a cover and hence is above the lower edge of the covers 46 and 60 by an amount corresponding to the height of the border element 36. Similarly, the middle groove 72 is displaced a face-dimension distance from the groove 70, and the lower groove 74 a face-dimension distance from the groove 72. Accordingly, the distance from the groove 74 to the bottom edge 39 of the easel is generally equal to the distance between the lower edge 80 and the lower edge of the covers 52 and 54. Because of the described geometry when the easel 14 is placed in the lower region 30 with its upper edge 37 abutting the ridge, its lower edge 39 abutting the element 22 and its side 33 abutting the border element 20, the side 35 is spaced from the border element 24 by a distance corresponding to the longer face dimension, i.e., width, of the covers. Such locaton is commonly referred to as the "start" position. Since the easel is symmetrical, when the easel is moved laterally from the start position to a position where the side 35 abuts the border element 24, the side 33 is spaced from the border element 20 by the width of the covers. With the easel in the described position it should be recognized that the cover 60 occupies the identical location previously occupied by the cover 46. Furthermore, when the easel 14 is slid upwardly on the surface 28 from the start position to a position where the ridge 26 engages the groove 70 and the side 33 abuts the element 20, the cover 48 then occupies the location originally occupied by the cover 46. In this manner it should be obvious that by stepping and repeating this locating procedure the covers 50, 52, 54, 56, 58 and 60 can be sequentially located in the location originally occupied by the cover 46.

In operation, a sheet of standard size developed photographic print paper is placed on the paper support surface 40 with its side edges in the channels 42 and 44. The easel 14 is then placed on the top surface 16 in the start location. The apparatus 10 is then placed beneath an enlarger 82 (see FIG. 2) which holds the negative to be printed. The enlarger is raised or lowered until the correct image size is formed on cover 46. Then the cover 46 is opened and the image is focused on the developed sheet of print paper. The enlarger is thus set to expose all prints of this size on the easel.

To individually expose each picture, the developed sheet of paper is removed and replaced by a sheet of undeveloped print paper, and the cover 46 is folded back onto the adjacent top surface of the border element 38. This uncovers the portion of the print paper to be exposed and provides a clean sharp edge at the hinged edge. The uncovered portion of print paper is then exposed for an appropriate length of time and the hinged cover is folded back to a covering position. Since the other covers remained over the print paper, only that portion of the print paper under cover 46 is exposed.

Next, the easel is slid upwardly until the ridge 26 engages the groove 70. With the edge remaining in an abutting relationship with the side element 20, the cover 48 occupies the position that was previously occupied by the cover 46 and hence that portion of the print paper beneath the cover 48 is in focus beneath the enlarger. In a similar manner, the cover 48 is folded back onto the border element 38 and exposed by the enlarger. This process is repeated for the covers 50 and 52 thereby producing a column of four identical, borderless prints.

Thereafter, the easel 14 is slideably moved along the ridge 26 so that its edge 35 abuts the element 24. Because of the described configuration of the support 12 and the easel 14, the cover 54 now occupies a position under the enlarger 82. The process previously described is now repeated for the covers 54-60, thereby producing a column of four borderless prints adjacent the first column.

An additional feature illustrated schematically by the dashed lines 83 in FIG. 2, includes microswitches 86 and 88 embedded and below the upper surface 16 of the lower portion 30 in symmetrical locations as to be actuated by the handles 62 when the appropriate cover is fully opened. One terminal of the microswitches 86 and 88 is connected by conductor 87 to the positive terminal of a power supply 90 which serves to energize the switches. The other terminals of the microswitches 86 and 88 are connected by conductors 92 and 94, respectively, to an OR gate 95 having its output terminal connected by a conductor 96 to an actuating terminal of the enlarger 82. The OR gate 95 serves to provide an actuating signal to the enlarger when one of the microswitches 86 or 88 are closed. A counter 97 is connected to the conductor 96 and serves to provide an indication of the number of prints made by the apparatus.

In operation, when the easel 14 is positioned in the start position with the door 46 under the enlarger 82 subsequent opening of the door 46 causes the tab 62 to engage and close the switch 88. With the switch 88 closed, a signal is provided to the inputs of the OR gate 95, which conducts an actuating signal to the enlarger 82. Such signal serves to actuate the enlarger 82 and causes the counter 97 to provide an indication of same. This automated feature further decreases the time required to expose a sheet of prints.

Another embodiment of the invention is partially illustrated in FIG. 3. The fundamental difference between the embodiment illustrated in FIG. 3 and that illustrated in FIGS. 1 and 2 is that the covers or doors are slideably mounted in the easel. As shown, the edge element 100 of the easel 102 is disposed above the lower element 104 and in a covering relationship with the covers 106, each of which includes a handle 108.

In operation, to open the cover 106, the handle 108 is pushed toward the corresponding edge element 100 which uncovers the desired portion of the print paper (not shown). After the paper is exposed the cover is pushed back and the easel is stepped to the next position where the process described above is repeated.

Yet another alternative of the present invention is illustrated schematically in FIG. 4. In this embodiment the inner surfaces 110 of the side elements 112 are inclined at an angle of about 10° relative to the paper support surface 114 of the support 116 and serve to hold the edges of the print paper flat. Similarly, the sides 118 of the covers 120 are formed at the identical angle. The cover 120' is shown masking a sheet of print paper 121 in dashed lines and in an open position in solid lines. As in the previously described embodiment a hinge 122 formed of an adhesive material is attached to the adjacent portions of the top surfaces of the element 112 and the cover 120. The particular angle of 10° has been chosen since it has been found that light emitted by the enlarger 124 diverges at an angle of about 10°. Accordingly, by forming the appropriate surfaces of the side elements and the cover at such an angle parallax does not occur along the edges of the prints. The operation of the apparatus of this embodiment is similar to that previously described wherein the covers 120 are sequentially folded back to uncover desired portions of the print paper 121.

Referring now to FIGS. 5 and 6, another alternative embodiment of the present invention is illustrated. As shown, the support 130 includes three elongated grooves 132, 134 and 136 extending between the upper edge 138 and the lower edge 140. The outer grooves 132 and 136 include five holes 142 symmetrically disposed and extending below the bottom surface of the grooves. (The holes 142 are shown in dashed lines in FIG. 6). An easel 144 similar to the one described in the preferred embodiment includes six detents 146 (see FIG. 6) that are loaded with springs 148 into recesses in its lower surface 150 such that the tips of the detents normally protrude below the surface 150. Three of the detents 146 are located near each opposed side edges of the easel 144 to mate with three of the holes 142 when a respective edge of the easel 144 abuts the corresponding side of the support 130. Consequently, when the detents 146 are moved along the groove 132, the opposed detents are able to slide for sliding along the groove 134. In operation, the easel 144 is disposed with its left and lower edges abutting corresponding surfaces of the support 130. In this position, the lefthand detents 146 engage the three lower holes of the groove 134 which assures that the upper cover 154 in the righthand column is beneath the enlarger. After the portion of the photographic sheet under that cover is exposed, the easel 144 is moved up until the three detents engage the next sequence of holes. The operation of the apparatus is similar to that previously described.

The terms "upper" and "lower" and words of similar import as used herein are intended to apply only to the position of the parts as illustrated in the drawing, since it is well known that easels of the general type may be mounted or oriented in many different positions during operation.

Although not shown it should be recognized that the number of grooves in the easel can vary depending upon the number of covers employed and can be eliminated in the case of two or four exposure easels which use the corners of the support as stops. In addition, the size of the print paper can be selected to provide four prints that are 5 by 7 inches or four prints that are 8 by 10 inches.

From the above, it can be seen that a photo developing apparatus has been described which fulfills all of the objects and advantages set forth above.

While there has been described what are at present considered to be the preferred embodiments of the invention, it will be understood that various modifications may be made therein and it is intended to cover in the appended claims all such modifications as fall within the true spirit and scope of the invention.

What is claimed is:

1. A photographic developing apparatus comprising:
    an easel having a rectangular shape in plan view with opposed upper and lower edges, opposed first and second side edges and opposed top and bottom surfaces, said easel including first and second opposed elongated sidewalls adjacent said side edges and protruding from said top surface so as to form the central portion of said top surface into a rectangular planar paper support surface having an areal dimension capable of supporting a sheet of photographic print paper, a plurality of covers arranged in first and second parallel columns in a covering relationship on said paper support surface, first hinge means for hinging said covers in said first column to said first sidewall such that said covers are capable of being selectively opened and closed, second hinge means for hinging said covers in said second column to said second sidewall such that said covers are capable of being selectively opened and closed, and first means formed on said bottom surface that are capable of being engaged; and
    an easel support including a planar surface having a central area corresponding to a predetermined location, four elongated elements protruding from said planar surface and arranged in a rectangular pattern, said elements each including an inner locating surface so as to provide opposed first and second side surfaces and opposed upper and lower surfaces, said side surfaces and said upper and lower surfaces having a dimension such that when said easel is positioned on said planar surface with its lower edge and its first side edge abutting said lower and said first surfaces, respectively, the upper cover in the second column is in said predetermined location, and second means forming a portion of said planar surface into an easel guide and serving to cooperate with said first means so as to engage and retain said easel in a plurality of fixed locations, each said fixed location corresponding to a location wherein a cover is disposed in said predetermined location, whereby when the first side edge abuts said first surface and said first and second means are engaged each cover in said second column is capable of being located in said predetermined location, and whereby when the second side edge abuts said second surface and said first and second means are engaged each cover in said first column is capable of being located in said predetermined location.

2. A photographic developing apparatus as recited in claim 1 wherein said covers are identical.

3. A photographic developing apparatus as recited in claim 1 wherein said first means comprises a plurality of parallel grooves and said second means comprises a ridge extending normally between said first and second side surfaces, said ridge serving to engage a selected one of said grooves and retain said easel in a selected one of said fixed locations.

4. A photographic developing apparatus as recited in claim 1 wherein three grooves are formed in said bottom surface and said first and second columns comprise four covers.

5. A photographic developing apparatus as recited in claim 1 and further providing third means responsive to the opening of a cover and operative to provide an indication of such opening.

6. A photographic developing apparatus as recited in claim 1 and further comprising an actuatable enlarger, a counter for providing an indication of the number of times one of said covers is opened, and fourth means responsive to the opening of a cover and operative to provide a signal which is capable of actuating said enlarger and said counter.

7. A photographic developing apparatus as recited in claim 6 wherein said fourth means further comprises first and second microswitches embedded in said planar surface proximate said predetermined location.

8. A photographic developing apparatus as recited in claim 1 wherein said sidewalls include an inner surface formed at an acute angle relative to said top surface, said acute angle generally corresponding to the divergence of a beam of light emitted by an associated enlarger, said inner surfaces serving to maintain the sheet of print paper in a generally flat shape.

9. A photographic developing apparatus as recited in claim 1 wherein said first means comprises a first plurality of longitudinal detent members and a second plurality of opposed longitudinal detent members and said second means comprises a first longitudinal slot extending parallel and adjacent to said first side surface and a second longitudinal slot extending parallel and adjacent said second side surface, said slots each including a plurality of depressions spaced to retain said plurality of detent members when said easel is in one of said fixed locations.

10. A photographic easel comprising a rectangularly shaped board having opposed upper and lower edges, opposed first and second side edges and opposed top and bottom surfaces, said easel including first and second opposed elongated side walls adjacent said side edges and protruding from said top surface so as to form the central portion of said top surface into a rectangular planar paper support surface having an areal dimension capable of supporting a sheet of photographic print paper, a plurality of covers arranged in first and second parallel columns in a covering relationship on said paper support surface, a first guide means comprising a first elongated slot formed in said first side wall wherein said first column of covers may freely slide to facilitate the removal and replacement of said covers in said first column upon said paper support surface, such that said covers are capable of being selectively opened and closed second guide means comprising a second elongated slot formed in said second side wall wherein said second column of covers may freely slide to facilitate the removal and replacement of said covers in said second column on said second paper support surface such that said covers are capable of being selectively opened and closed, whereby the total of the surface areas covered by said plurality of covers is substantially equal to the surface area of said sheet of photographic print paper.

11. A photographic easel comprising a rectangularly shaped board having opposed upper and lower edges, opposed first and second side edges and opposed top and bottom surfaces, said easel including first and second opposed elongated side walls adjacent said side edges and protruding from said top surface so as to form the central portion of said top surface into a rectangular planar paper support surface having an areal dimension capable of supporting a sheet of photographic print paper, where said side walls include an inner surface formed at an acute angle relative to said top surface, said acute angle generally corresponding to the divergence of a beam of light emitted by an associated enlarger, said inner surface serving to maintain the sheet of print paper in a generally flat shape, a plurality of covers arranged in first and second parallel columns in a covering relationship on said paper support surface, first guide means on a first sidewall for facilitating the removal and replacement of said covers in said first column upon said paper support surface, such that said covers are capable of being selectively opened and closed, second guide means on a second sidewall for facilitating the removal and replacement of said covers in said second column on said second paper support surface such that said covers are capable of being selectively opened and closed, whereby the total of the surface areas covered by said plurality of covers is substantially equal to the surface area of said sheet of photographic print paper.

12. A photographic developing apparatus comprising:
an easel having a rectangular shape in plan view with opposed upper and lower edges, opposed first and second side edges and opposed top and bottom surfaces, said easel including first and second opposed elongated sidewalls adjacent said side edges and protruding from said top surface so as to form the central portion of said top surface into a rectangular planar paper support surface having an areal dimension capable of supporting a sheet of photographic print paper, a plurality of covers arranged in first and second parallel columns in a covering relationship on said paper support surface, first hinge means for hinging said covers in said first column to said first sidewall such that said covers are capable of being selectively opened and closed, second hinge means for hinging said covers in said second column to said second sidewall such that said covers are capable of being selectively opened and closed, and first means formed on said bottom surface that are capable of being engaged; and
an easel support including a planar surface having a central area corresponding to a predetermined location, four elongated elements protruding from said planar surface and arranged in a rectangular pattern, said elements each including an inner locating surface so as to provide opposed first and second side surfaces and opposed upper and lower surfaces, said side surfaces and said upper and lower surfaces having a dimension such that when said easel is positioned on said planar surface with its lower edge and its first side edge abutting said lower and said first surfaces, respectively, the upper cover in the second column is in said predetermined location, and second means forming a portion of said planar surface into an easel guide and serving to cooperate with said first means so as to engage and retain said easel in a plurality of fixed locations, each said fixed location corresponding to a location wherein a cover is disposed in said predetermined location, whereby when the first side edge abuts said first surface and said first and second means are engaged each cover in said second column is capable of being located in said predetermined location, and whereby when the second side edge abuts said second surface and said first and second means are engaged each cover in said first column is capable of being located in said predetermined location, and third means responsive to the opening of a cover and operative to provide an indication of such opening.

13. A photographic developing apparatus comprising:
an easel having a rectangular shape in plan view with opposed upper and lower edges, opposed first and second side edges and opposed top and bottom surfaces, said easel including first and second opposed elongated sidewalls adjacent said side edges and protruding from said top surface so as to form the central portion of said top surface into a rectangular planar paper support surface having an areal dimension capable of supporting a sheet of photographic print paper, a plurality of covers arranged in first and second parallel columns in a covering relationship on said paper support surface, first hinge means for hinging said covers in said first column to said first sidewall such that said covers are capable of being selectively opened and closed, second hinge means for hinging said covers in said second column to said second sidewall such that said covers are capable of being selectively opened and closed, and first means formed on said bottom surface that are capable of being engaged; and an easel support including a planar surface having a central area corresponding to a predetermined location, four elongated elements protruding from said planar surface and arranged in a rectangular pattern, said elements each including an inner locating surface so as to provide opposed first and second side surfaces and opposed upper and lower surfaces, said side surfaces and said upper and lower surfaces having a dimension such that when said easel is positioned on said planar surface with its lower edge and its first side edge abutting said lower and said first surfaces, respectively, the upper cover in the second column is in said predetermined location, and second means forming a portion of said planar surface into an easel guide and serving to cooperate with said first means so as to engage and retain said easel in a plurality of fixed locations, each said fixed location corresponding to a location wherein a cover is disposed in said predetermined location, whereby when the first side edge abuts said first surface and said first and second means are engaged each cover in said second column is capable of being located in said predetermined location, and whereby when the second side edge abuts said second surface and said first and second means are engaged each cover in said first column is capable of being located in said predetermined location; and an actuatable enlarger, a counter for providing an indication of the number of times one of said covers is opened, and fourth means responsive to the opening of a cover and operative to provide a signal which is capable of actuating said enlarger and said counter.

14. A photographic developing apparatus as recited in claim 13 wherein said fourth means further comprises first and second microswitches embedded in said planar surface proximate said predetermined location.

15. The photographic easel as recited in claim 11 wherein said first guide means comprises a first hinge means for hinging said covers in said first column to said first side wall, and wherein said second guide means comprises a second hinge means for hinging said covers in said second column to said second side wall.

16. The photographic easel as recited in claim 11 wherein said first guide means comprises a first elongated slot formed in said first side wall wherein said first column of covers may freely slide and wherein said second guide means comprises a second elongated slot formed in said second column of covers may freely slide.

* * * * *